United States Patent [19]

Rubi

[11] Patent Number: 4,851,704

[45] Date of Patent: Jul. 25, 1989

[54] WAVE ACTION ELECTRICITY GENERATION SYSTEM AND METHOD

[76] Inventor: Ernest P. Rubi, 2620 E. 7th St., Tucson, Ariz. 85716

[21] Appl. No.: 258,866

[22] Filed: Oct. 17, 1988

[51] Int. Cl.[4] ............................................. F03B 13/12
[52] U.S. Cl. ....................................... 290/53; 417/332
[58] Field of Search ................... 290/42, 53; 417/330, 417/331, 332; 60/497, 501

[56] References Cited

U.S. PATENT DOCUMENTS

| | | | |
|---|---|---|---|
| 3,959,663 | 5/1976 | Rusby | 290/53 |
| 4,185,947 | 1/1980 | Menk | 417/33 |
| 4,256,971 | 3/1981 | Griffith | 290/53 |
| 4,305,003 | 12/1981 | Basurto et al. | 290/54 |
| 4,316,704 | 2/1982 | Heidt | 417/332 X |
| 4,398,095 | 8/1983 | Ono | 290/53 |
| 4,438,343 | 3/1984 | Marken | 290/53 |
| 4,627,240 | 12/1986 | Holmes | 60/507 |
| 4,719,158 | 1/1988 | Salomon | 290/53 X |

Primary Examiner—William M. Shoop, Jr.
Assistant Examiner—W. E. Duncanson, Jr.
Attorney, Agent, or Firm—Victor Flores; Harry M. Weiss

[57] ABSTRACT

This invention discloses a wave action electricity generation system that includes a floating platform that supports the system components on the surface of a body of water, an anchor means for controlling movement of the platform to a desired water surface area of the body of water, a kinetic energy converter that converts wave motion energy into mechanical energy and an electricity generator that converts the mechanical power transfer strokes into electrical energy. The kinetic energy converter includes a cylinder containing a fluid, such as a lubricant, in opposed cylinder chamber portions, a first heavily weighted piston that is slidably and freely disposed within the body of the cylinder. The heavily weighted piston is slidably responsive to the wave motion energy of the body of water and is used to compress the fluid to produce respective compression power strokes in each of the cylinder chamber portions. The energy in the compression stroke is received by a second and third pistons located in the cylinder chamber portions that further produce power transfer strokes through the ends of the cylinder. The power transfer strokes associated with the first and second pistons are further converted by a geared transmission to rotary motion that turns a flywheel coupled to an electricity generator. The electrical energy produced is then distributed to a remote power station via a power transmission line.

13 Claims, 3 Drawing Sheets

WAVE ACTION ELECTRICITY GENERATION SYSTEM AND METHOD

FIELD OF THE INVENTION

The present invention relates to electrical energy generation systems and more particularly, the present invention relates to electricity generation systems that convert wave motion of large bodies of water to kinetic energy that is used to produce electrical energy. Yet more particularly, the invention relates to wave motion electricity generations systems that utilize weighted pistons within a cylinder as the principle element in the energy conversion process.

DESCRIPTION OF THE PRIOR ART

The prior art teaches various systems that are directed to the production of electrical energy from wave motion. The following prior art patents are believed to be most relevant to the teachings of the present invention.

U.S. Pat. No. 3,959,663 to Rusby teaches a tide powered electric generator. A float means raises a weight on successive tides by means of a jack bar. The weight is supported on a support structure until released for generation of electricity.

U.S. Pat. No. 4,185,947 to Menk teaches a wave-actuated energy transfer apparatus. Of interest is the teaching of using a stationery cylinder adapted to receive a piston that forces water vertically up a pipe and then controlling the downward flow, such as by directing the water for turning a turbine of an electric generator.

U.S. Pat. No. 4,305,003 to Basurto et. al. teaches an energy generating apparatus. The primary component of interest is a float means that raises and lowers and whose movement is utilized by pumps which in turn provide flow to drive turbines that generate electrical power.

U.S. Pat. No. 4,627,240 to Holmes teaches a device to convert the motions of waves in a body of water to other forms of energy. The primary element comprises a float device that is restricted to vertical motion that is coupled to an actuating means and a rotating means during a power strobe.

U.S. Pat. No. 4,398,095 to Ono teaches a wave activated power generation system. The system includes a piston-cylinder means wherein a slidable piston forces a fluid to flow onto a water wheel generator that produces electricity.

Although the prior art has taught the use of cylinders and pistons to capture the energy that is so visably available in the waves of large bodies of water, there has been a tendency to make the structures that carry the cylinder and pistons as rigid structures that are firmly anchored to the floor of the body of water. This is believed to be inefficient in accomplishing the objective of the systems, i.e. the systems are dependent on the rigid structure for the conversion process and are not allowed to freely float with the waves and produce electricity with every oscillation available. The systems that have attempted to solve this inefficiencies have added costly pump stations in the conversion stage that controls the flow of fluids compressed by the piston to feed turbine generators.

Therefore, there is felt to be a need for a system that can freely float in a body of water and synchronously capture the available energy of the waves. Therefore, it is a primary object of the present invention to provide a floating platform that is anchored to the floor of a body of water, yet is not structurally dependent on the anchor means for the energy conversion. It is also a primary object of the present invention to provide a floating platform that is adapted with a cylinder and piston arrangement that will respond to every oscillation of the water wave motion to produce electricity without the need for pumping stations to relay the transfer of energy.

SUMMARY OF THE INVENTION

The present invention provides an improved wave action electricity generation system designed to satisfy the aforementioned objectives. The present invention provides a floating platform means that supports the system on the surface of a body of water, an anchor means for controlling movement of the platform means to a desired water surface area of said body of water, a kinetic energy generation means for converting wave motion energy into mechanical energy and an electric energy generation means for converting the mechanical power transfer strokes into electrical energy. The kinetic energy generation means includes a cylinder containing a fluid, such as a lubricant, in each of the opposed chamber portions of the cylinder means and a first heavily weighted primary piston that is slidably and freely disposed within the body of the cylinder between the opposed cylinder chamber portions. The heavily weighted piston means is slidably responsive to the wave motion energy of the body of water and is used to compress the fluid to produce respective compression power strokes in the opposed chamber portions. The energy in the compression stroke is received by a second and third piston means located respectively in the chamber portions that further produce respective power transfer strokes through the ends of the cylinder. The power transfer strokes associated with the first and second piston means is further converted by a geared transmission means to rotary motion that turns a flywheel coupled to an electricity generator. The electrical energy produced is then distributed to a remote power station via a power transmission line.

Therefore, to the accomplishments of the foregoing objects, the invention consists of the foregoing features hereinafter fully described and particularly pointed out in the claims, the accompanying drawings and following disclosure describing in detail the invention, such, drawings and disclosure illustrating, however, but one of the various ways in which the invention may be practiced.

DESCRIPTION OF THE PREFERRED EMBODIMENTS

Figure 1:
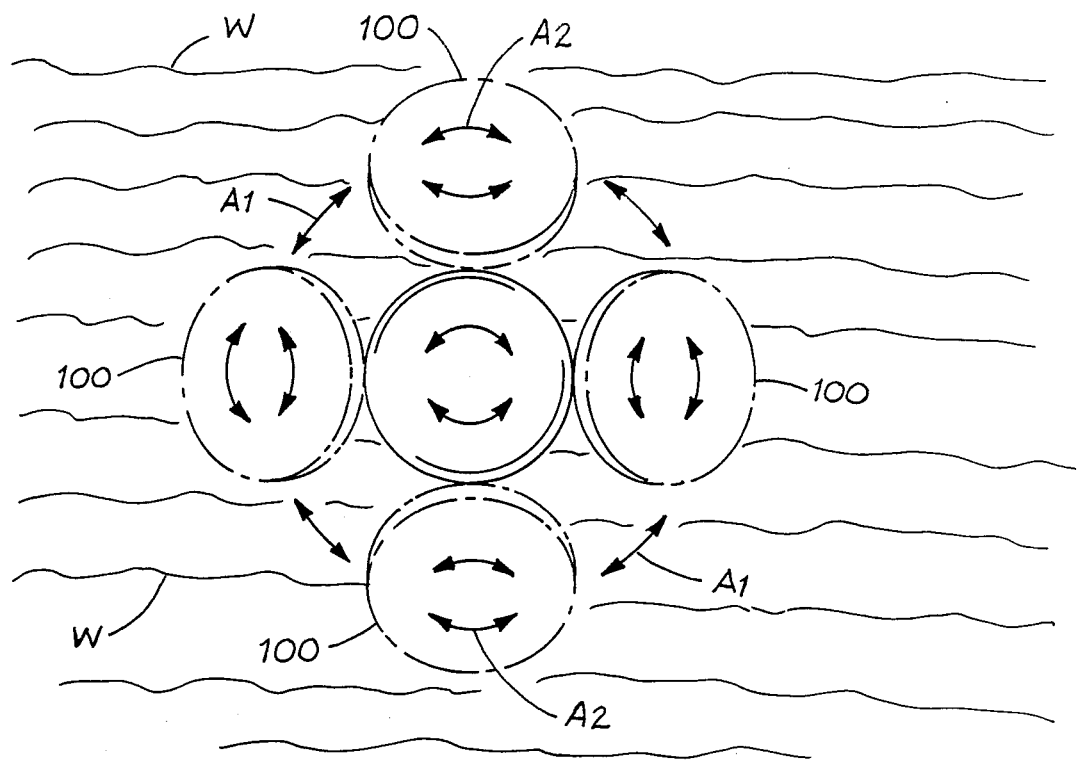
FIG. 1 is a plan view of the floating electrical energy generating system of the present invention illustrating the 360 degrees of floatation freedom possible to maximize wave motion energy transfer in a body of water.
Figure 2:
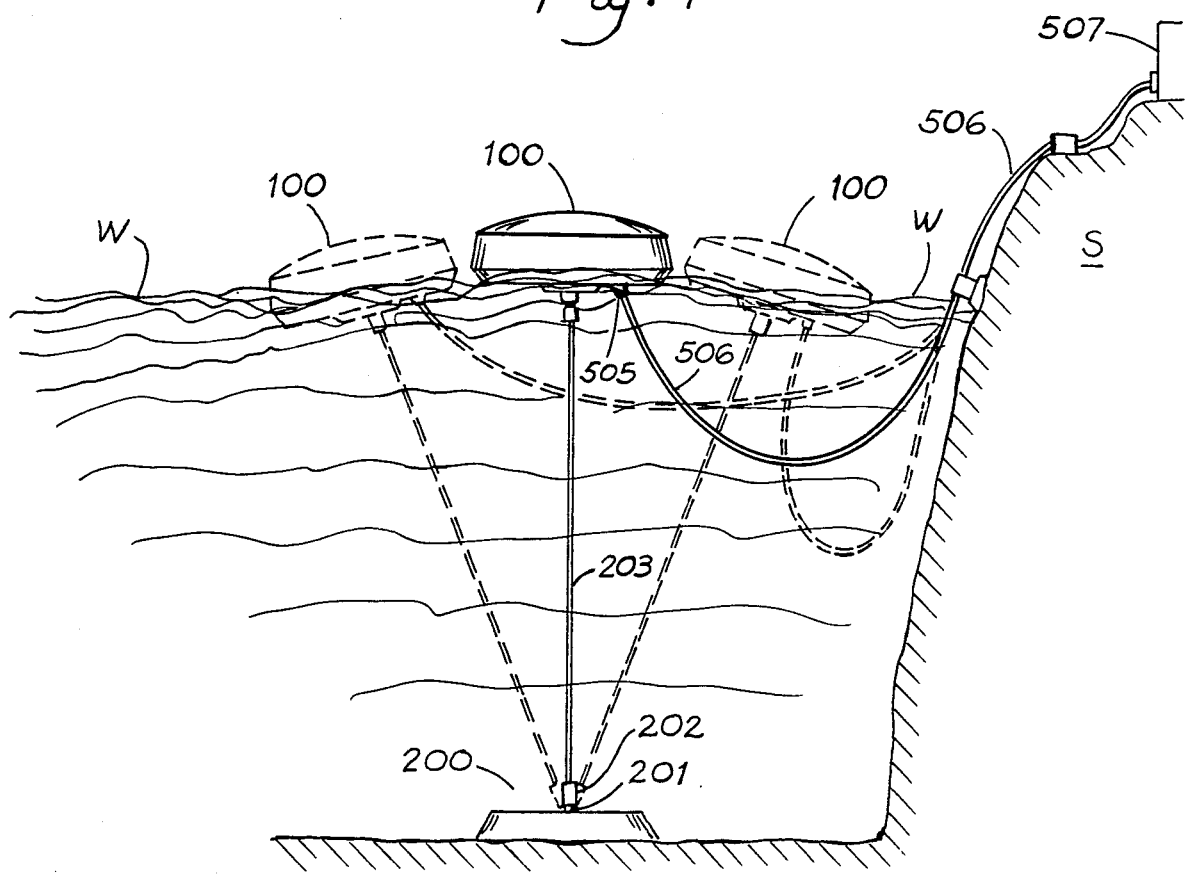
FIG. 2 is a sectional side view of the electrical energy generating system of the present invention illustrating an anchor scheme and power distribution to a remote power receiving station on shore.

Referring now to FIGS. 1 and 2, where the wave action electricity generation system, generally designated 100, is shown floating turbulently in a body of water having waves W. The system 100 is shown anchored by anchor means 200 to the floor of a body of water and allowed to freely float, as indicated by arrows A1, and rotate, as indicated by arrows A2, in a circular manner on the surface of the body of water and whose travel is limited and defined by the length of cable means 203 having an end 202 connected to anchor means 200 at an anchor end 201. Shown also in FIG. 2 is a power distribution cable 506 connected to system 100 at power distribution connector 505 and terminating at a remote power receiving station 507, located on shore S.

Figure 3:
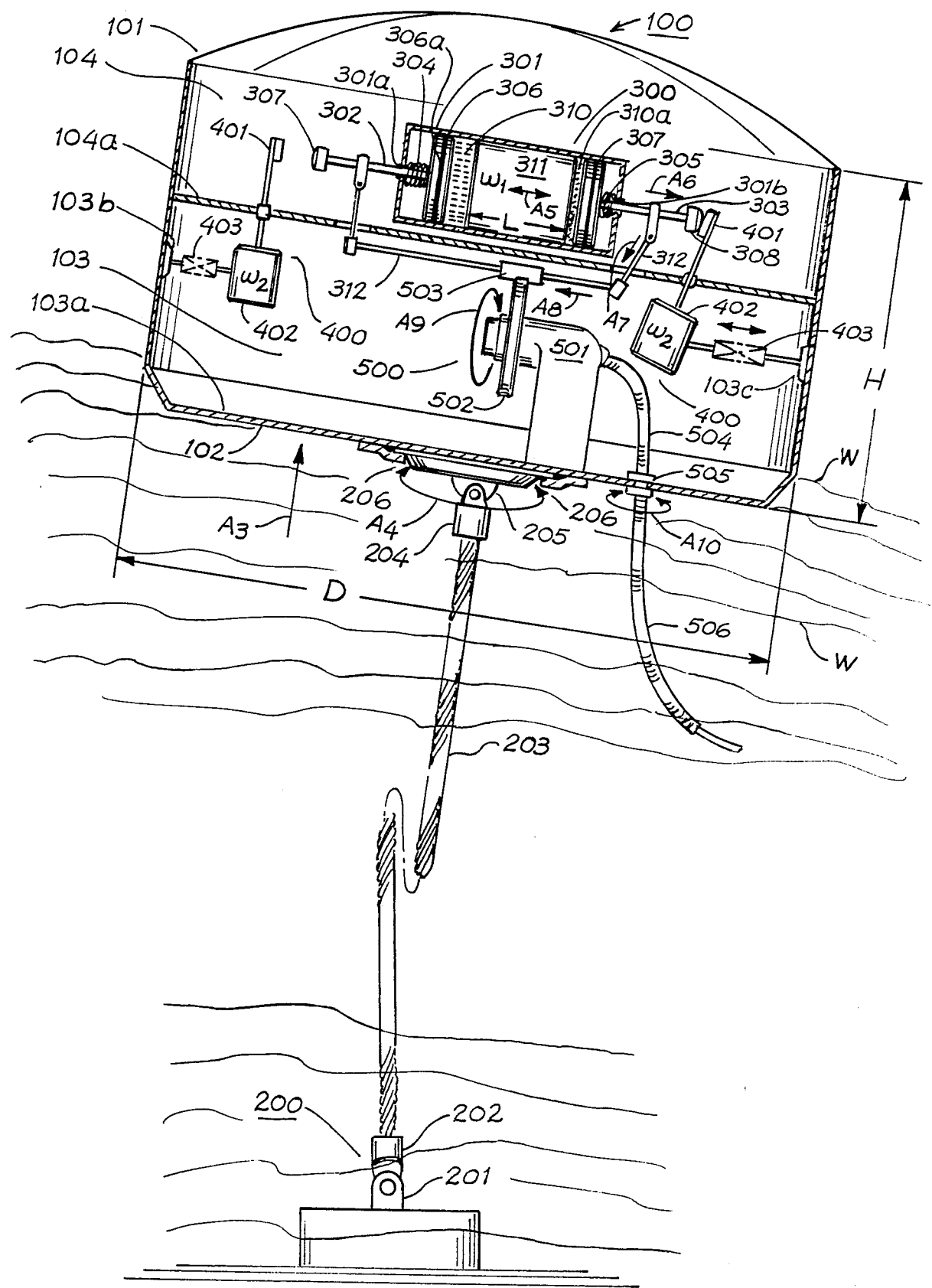
FIG. 3 is an enlarged side sectional view of the floating system illustrating an anchored floating platform in the shape of a sealed cylindrical tank adapted with two floor levels that support the kinetic energy transfer means and the electrical energy generator means.
Figure 4:
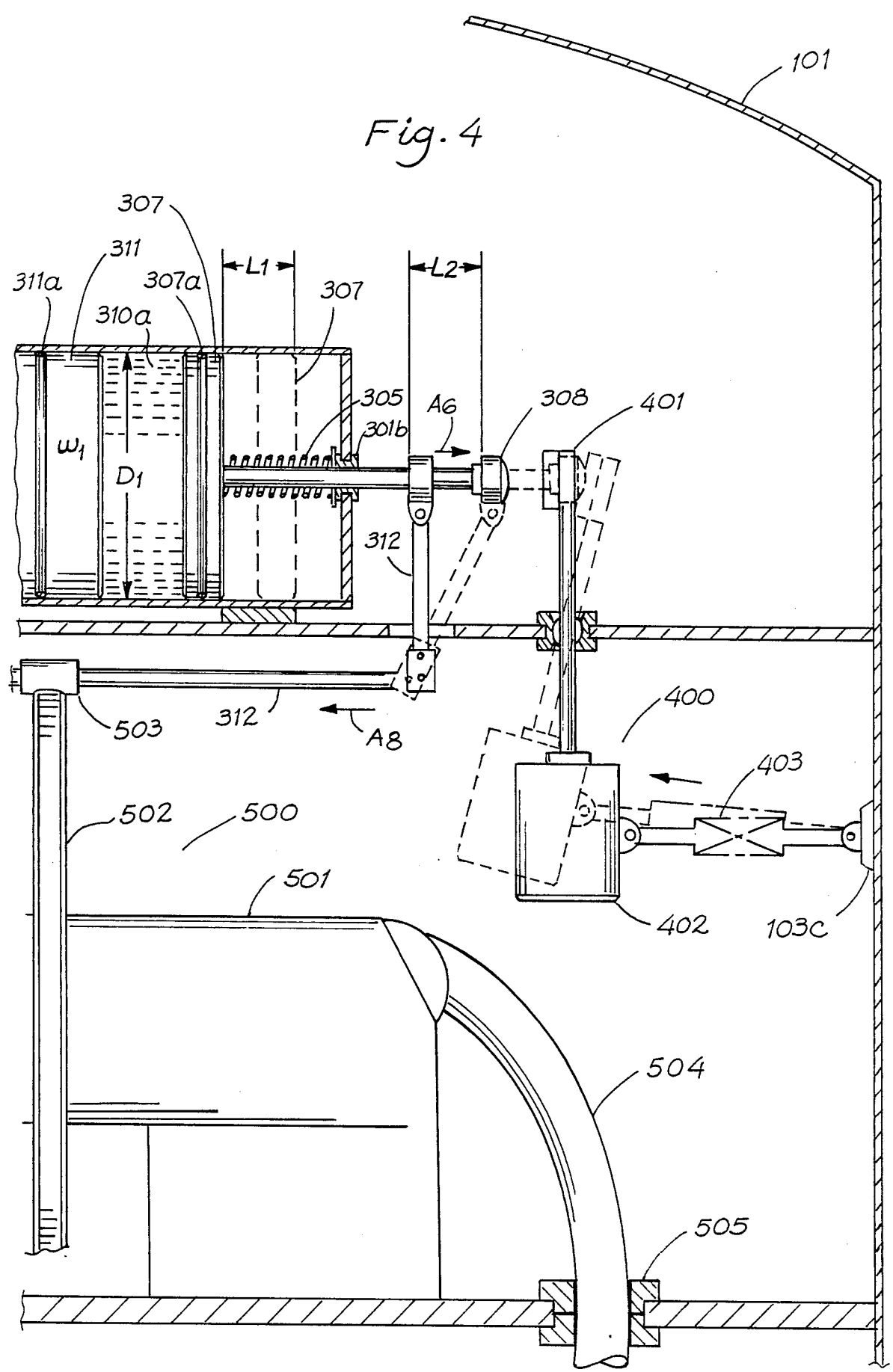
FIG. 4 is an enlarged partial side view of the kinetic energy transfer means and the electrical energy transfer means illustrating a compression and power transfer stroke being damped by a counter balance means.

Referring now to FIGS. 3 and 4, system 100 is shown comprised of a platform member 101 in the shape of a cylindrical tank having a submerged portion 102 adapted for attachment to swivel means 206. Swivel means 206 being adapted for attachment to cable end 204 at attachment means 205. The platform member 101 is shown adapted with a lower compartment 103 having a floor 103a for housing and supporting electrical energy generating means 500 and part of a counter balance member 400 and an upper compartment 104 having a floor 104a that houses and supports the kinetic energy transfer means 300 and part of the counter balance member 400. Kinetic energy transfer means 300 is comprised of a cylinder 301 adapted with ends 301a and 301b. Within cylinder 301 are located a first heavily weighted piston means 311 having a weight W1, a second and third piston means 306 and 307 and a fluid means 310 sealed in opposed cylinder portions defined to be between respective opposed ends of first piston means 311 and second and third piston means 306 and 307. Fluid means 310 is compressively sealed in the cylinder portions by adapting the piston means 306, 307 and 311 with o-rings 306a, 307a and 311a that maintain expansion forces against the walls of cylinder 301 throughout a compression and power transfer stroke.

In operation, wave motion from waves W causes a lifting on submerged platform portion 102, as indicated by arrow A3, or rotation of swivel means 206, as indicated by arrow A4, that causes piston 311 to oscillate and create compression strokes, as shown by arrow A5, within cylinder 301 towards second and third piston means 306 or 307 to compress fluid 310 to a state as indicated by 310a. The compression strokes cause pistons 306, 307 to plunge rods 302, 303 through ends 301a, 301b as power transfer strokes, as indicated by arrow A6, A7, and A8, compressing spring members 04, 305 and urging mechanical linkage arm 312 towards transmission gear means 503. The stroke travel L2 of rods 302, 303 and the compression distances L1 of spring members 304, 305 are variables that depend on the size of the cylinder 301 and the size and mass of the first piston means 311. For example, system 100 may have a diameter D of 40 feet and a height H of 20 feet, a first piston means having a length L of 25 feet and a diameter D1 of 5 feet that weighs 50,000 pounds. This arrangement would then produce a stroke distance L2 of 5 feet.

To limit the travel of rods 302, 303, identical counter balance means 400, having arm 401, a weight means 402 of weight W2 and damper 403 are mounted to floor 104a and side walls at 103b and 103c. As rods 302, 303 reach the zenith in their stroke, counter balance arms 401 come into contact with rod arm ends 307, 308 to have the power transfer stroke dampened by the resistance of weight means 402 and damper 403 in preparation for an alternate power stroke. During the urging of linkage 312 by the power transfer strokes, gear box 503 converting every power transfer stroke into continuous rotary motion that is mechanically coupled to flywheel means 502. Flywheel means 502 is then used to drive a conventional electric generator 501 that produces electricity. The electrical energy generating means 500 is adapted with an internal power output cable 504 that interfaces to power transmission line 506 via a swivel power connector 505 that allows rotation, as indicated by arrow A10.

Once the system 100 starts producing electricity, power transmission principles apply and are believed to be well known and implementable by persons skilled in the art of power utilities. Suffice it to say that the power generated is distributed to shore using conventional power transmission means.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus or system.

I claim:

1. A wave action electric generation system for converting wave motion energy in a body of water into electrical energy, said system comprising:
   (a) a floating platform means for supporting said system on the surface of said body of water;
   (b) an anchor means for controlling movement of said platform means to a desired water surface area of said body of water;
   (c) a kinetic energy generation means for converting said wave motion energy into mechanical energy, said kinetic energy generation means comprising,
      (i) a cylinder means,
      (ii) a fluid means contained in respective first and second chamber portions of said cylinder means,
      (iii) a first piston means slidably and freely disposed within said cylinder means between said first and second chamber portions, said first piston means being slidably responsive to said wave motion energy to produce respective compression power strokes in said first and second chamber portions, and
      (iv) a second and third piston means located respectively in said first and second chambers for receiving said compression power strokes and further producing respective power transfer strokes; and
   (d) an electric energy generation means for converting said power transfer strokes into electric energy.

2. A wave action electric generation system for converting wave motion energy as recited in claim 1, said system further comprising:
   (a) a kinetic energy transfer means for receiving said respective power transfer strokes and producing rotary motion, said kinetic energy transfer means comprising,
(i) a first and second mechanical linkage means for coupling to said respective second and third piston means,
(ii) a first and second counter balance means for limiting the travel of said second and third piston means during respective power transfer strokes, and
(iii) a gear means for converting said power transfer strokes into a first stage of rotary motion, said gear means being mechanically coupled to said electric energy generation means.

3. A wave action electric generation system for converting wave motion energy as recited in claim 2, wherein:
said electric energy generation means comprises,
(i) a flywheel means mechanically coupled to said gear means for receiving said first stage of rotary motion and producing a second stage of rotary motion, and
(ii) an electric generator means coupled to said flywheel means to convert said second stage of rotary motion into electric energy, and
(iii) an electric power distribution means for distributing said electric energy to a remote power receiving station for storage and further distribution.

4. A wave action electric generation system for converting wave motion energy as recited in claim 3, wherein:
said electric power distribution means is adapted with a swivel power output connector means for distributing said electric energy to said remote power receiving station.

5. A wave action electric generation system for converting wave motion energy as recited in claim 1, wherein:
said fluid means is a lubricant, said lubricant being sealed in said respective first and second chambers by o-ring means adapted to fit on said first, second and third piston means.

6. A wave action electric generation system for converting wave motion energy as recited in claim 1, wherein:
said first piston means is a massive, metallic piston structure weighing at least one thousand pounds.

7. A wave action electric generation system for converting wave motion energy as recited in claim 1, wherein: said anchor means is adapted with a swivel interface means for attaching to said platform means and allow rotary movement.

8. A wave action electric generation system for converting wave motion energy in a body of water into electrical energy, said system comprising:
(a) a floating platform means for supporting said system on the surface of said body of water;
(b) an anchor means for controlling movement of said platform means to a desired water surface area of said body of water;
(c) a kinetic energy generation means for converting said wave motion energy into mechanical energy, said kinetic energy generation means comprising,
(i) a
(ii) a fluid means contained in respective first and second chamber portions of said cylinder means,
(iii) a first piston means slidably and freely disposed within said cylinder means between said first and second chamber portions, said first piston means being slidably responsive to said wave motion energy to produce respective compression power strokes in said first and second chamber portions, and
(iv) a second and third piston means located respectively in said first and second chambers for receiving said compression power strokes and further producing power transfer strokes;
(d) a kinetic energy transfer means for receiving said power transfer strokes and producing rotary motion, said kinetic energy transfer means comprising,
(i) a first and second mechanical linkage means for coupling to respective second and third piston means,
(ii) a first and second counter balance means for limiting the travel of said second and third piston means during respective power transfer strokes, and
(iii) a gear means for converting said power transfer stroke into a first stage of rotary motion;
(e) an electric energy generation means for converting said first stage of rotary motion into electric energy, said electric energy generation means comprising,
(i) a flywheel means coupled to said gear means for receiving said first stage of rotary motion and producing a second stage of rotary motion, and
(ii) an electric generator means coupled to said flywheel means to convert said second stage of rotary motion into electric energy; and
(f) an electric power distribution means for distributing said electric energy to a remote power receiving station for storage and further distribution.

9. A wave action electric generation system for converting wave motion energy as recited in claim 8, wherein:
said electric power distribution means is adapted with a swivel power output connector means for distributing said electric energy to said remote power receiving station.

10. A wave action electric generation system for converting wave motion energy as recited in claim 8, wherein:
said fluid means is a lubricant, said lubricant being sealed in said respective first and second chambers by o-ring means adapted to fit on said first, second and third piston means.

11. A wave action electric generation system for converting wave motion energy as recited in claim 8, wherein:
said first piston means is a massive, metallic piston structure weighing at least one thousand pounds.

12. A wave action electric generation system for converting wave motion energy as recited in claim 8, wherein: said anchor means is adapted with a swivel interface means for attaching to said platform means and allowing rotary movement.

13. A method for generating electrical energy from wave motion energy in a body of water into electrical energy, said method comprising the steps of:
(a) providing a wave action electric generation system, said system comprising,
(i) a floating platform means for supporting said system on the surface of said body of water,
(ii) an anchor means for controlling movement of said platform means to a desired water surface area of said body of water, (iii) a kinetic energy generation means for converting said wave motion energy into mechanical energy, said kinetic energy generation means comprising, a cylinder means, a fluid means contained in respective first and second chamber portions of said cylinder means, a first piston means slidably and freely disposed within said cylinder means between said first and second chamber portions, said first piston means being slidably responsive to said wave motion energy to produce respective compression power strokes in said first and second chamber portions, and a second and third piston means located respectively in said first and second chambers for receiving said compression power strokes and further producing power transfer strokes, (iv) a kinetic energy transfer means for receiving said power transfer strokes and producing rotary motion, said kinetic energy transfer means comprising, a first and second mechanical linkage means for coupling to respective second and third piston means, a first and second counter balance means for limiting the travel of said second and third piston means during respective power transfer strokes, and a gear means for converting said power transfer stroke into a first stage of rotary motion, (v) an electric energy generation means for converting said first stage of rotary motion into electric energy, said electric energy generation means comprising, a flywheel means coupled to said gear means for receiving said first stage of rotary motion and producing a second stage of rotary motion, and an electric generator means coupled to said flywheel means to convert said second stage of rotary motion into electric energy, and (vi) an electric power distribution means for distributing said electric energy to a remote power receiving station for storage and further distribution;

(b) preparing said provided wave action electric generation system for moving by locking all movable parts in a safe and transportable position;

(c) locating said transportable wave action electric generation system on the surface of a suitable body of water;

(d) anchoring said floating platform means to the floor of said body of water;

(e) enabling said wave action electric generation system to start operation by unlocking said previously locked moving parts;

(f) creating a power compression stroke in response to wave motion by means of slideable action of said first piston means;

(g) creating a power transfer stroke in response to said created compression power stroke by said second and third piston means;

(h) converting said power transfer stroke to rotary motion by said kinetic energy transfer means;

(i) creating electrical energy from said rotary motion by electric energy generation means; and (j) distributing said created electrical energy to said remote power receiving station.

* * * * *

UNITED STATES PATENT AND TRADEMARK OFFICE
CERTIFICATE OF CORRECTION

PATENT NO. : 4,851,704

DATED : JULY 25, 1989

INVENTOR(S) : ERNEST P. RUBI

It is certified that error appears in the above-identified patent and that said Letters Patent is hereby corrected as shown below:

In claim 8, column 5, line 64, after "(i) a" insert --cylinder means,--.

In claim 13, column 8, line 29, after "by" insert --said--.

Signed and Sealed this

Fourth Day of September, 1990

Attest:

HARRY F. MANBECK, JR.

*Attesting Officer*  *Commissioner of Patents and Trademarks*